United States Patent [19]

Rosenblad

[11] Patent Number: 4,944,839
[45] Date of Patent: Jul. 31, 1990

[54] INTERSTAGE LIQUOR HEATER FOR PLATE TYPE FALLING FILM EVAPORATORS

[75] Inventor: Axel E. Rosenblad, Seabright, N.J.

[73] Assignee: Rosenblad Corporation, Princeton, N.J.

[21] Appl. No.: 357,808

[22] Filed: May 30, 1989

[51] Int. Cl.$^5$ .............................................. B01D 1/00
[52] U.S. Cl. ................................... 159/13.1; 159/20.1;
    159/28.6; 159/43.1; 159/49; 159/901;
    159/DIG. 8; 165/113; 165/115; 202/174;
    202/236; 203/22; 203/27; 203/89; 203/DIG. 8
[58] Field of Search ............... 202/236, 174, 235;
    203/89, 22, 27, DIG. 8; 159/13.1, 20.1, 28.6,
    43.1, 49, DIG. 8, 901, 46; 165/115, 113

[56] References Cited

U.S. PATENT DOCUMENTS

| | | | |
|---|---|---|---|
| 2,960,160 | 11/1960 | Goodman | 159/28.6 |
| 3,150,028 | 9/1964 | Wennerberg | 159/28.6 |
| 3,307,614 | 3/1967 | Rosenblad | 159/28.6 |
| 3,310,105 | 3/1967 | Butt | 159/28.6 |
| 3,366,158 | 1/1968 | Rosenblad | 159/13.3 |
| 3,933,597 | 1/1976 | Barba et al. | 159/2.3 |
| 4,167,437 | 9/1979 | Gilbert | 202/174 |
| 4,167,454 | 9/1979 | Feres | 202/236 |
| 4,216,002 | 8/1980 | Rosenblad | 159/13.3 |
| 4,586,565 | 5/1986 | Hallström et al. | 159/13.2 |
| 4,764,254 | 8/1988 | Rosenblad | 159/28.6 |

FOREIGN PATENT DOCUMENTS 1118384  10/1984  U.S.S.R. .............................. 202/163

Primary Examiner—Virginia Manoharan
Attorney, Agent, or Firm—Brooks, Haidt, Haffner & Delahunty

[57] ABSTRACT

A falling film evaporator in which some plate elements have their upper portions surrounded by a hood to prevent feed liquor from contacting hot vapor generated in the evaporator and exchanging heat therewith by direct contact. Other elements are located outside the hood.

5 Claims, 2 Drawing Sheets

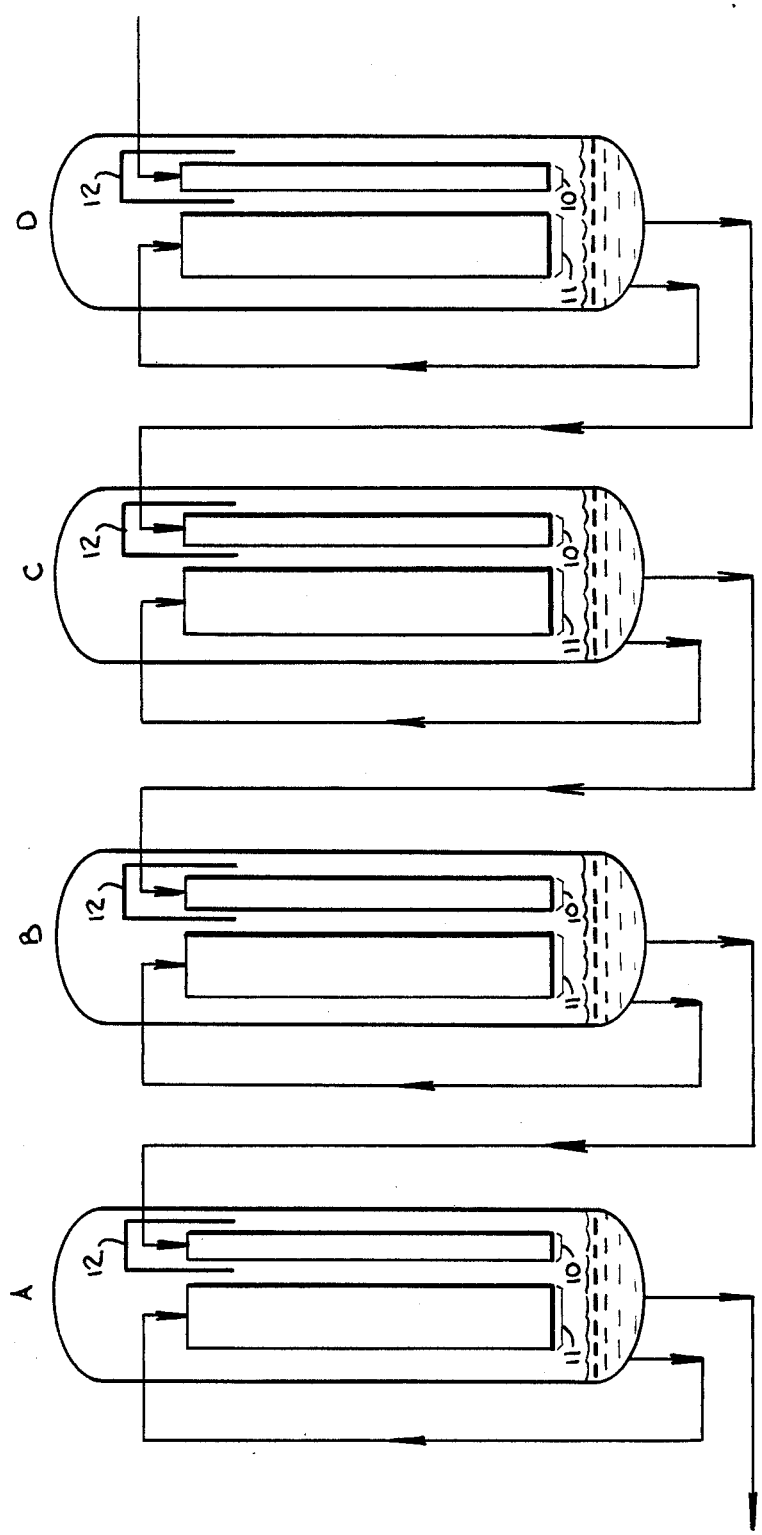

INTERSTAGE LIQUOR HEATER FOR PLATE TYPE FALLING FILM EVAPORATORS

BACKGROUND OF THE INVENTION

1. Field of the Invention

The invention relates to improving the performance of plate type falling film evaporators, and more particularly to an arrangement for pre-heating of feed liquor while cooling vent gases.

2. Description of the Prior Art

Falling film evaporators in which a liquid flows down the surfaces of heating elements which consist of pairs of plates joined at their peripheries are widely used. Such an evaporator is described in U.S. Pat. No. 3,366,158, issued Jan. 30, 1968. A selective condenser which employs plate type heat exchange elements is described in U.S. Pat. No. 4,216,002, issued Aug. 5, 1980.

Evaporators of the plate type, and evaporator systems generally, are subject to radiation losses and venting losses. Radiation losses can be reduced by use of insulation. Venting loses can be reduced by subcooling the vent gases before they exit the evaporator.

In some types of evaporators subcooling has been accomplished to some extent by the use of some form of internal liquor preheater/vent gas cooler arrangement and/or by the use of external heaters, but such arrangements have not been successfully employed in plate type falling film evaporators, because incoming liquor exchanges heat directly with vapor generated within the evaporator more efficiently than by indirect heat transfer with heating medium within the plate elements. This process dissipates the available temperature differential and driving force.

SUMMARY OF THE INVENTION

Liquor pre-heating and vent gas cooling in a falling film plate type evaporator is achieved in accordance with the present invention by surrounding the upper portions of some plate elements of an evaporator with a hood, beneath which noncondensibles collect when the evaporator is operated. The presence of the noncondensible gases prevents feed liquor from contacting hot vapor generated in the evaporator and exchanging heat therewith through direct contact.

The feed liquor is heated to its boiling point by heat exchange with the heating vapor which is within the plate elements, as the liquor flows down the element surfaces within the hood. This boiling produces both condensibles and noncondensibles, which can escape only by passing downward and below the periphery of the hood.

Liquor which has not vaporized continues its downward flow over the heating elements to be evaporated or collected at the bottom of the evaporator.

The heating vapor feed to the plate elements whose upper portions are within the hood comes from the upper portions of other heating elements, not located beneath the hood, and enters the plate elements of the subcooling section, i.e. the elements beneath the hood, near the lower ends of those elements.

Evaporators provided with subcooling and preheating sections in accordance with the invention may be advantageously employed as effects or stages of a multiple effect evaporator system through which heating steam and feed liquor to be evaporated pass in countercurrent flow.

The invention avoids the use of complex and expensive external heating arrangements. Other advantages of the arrangement of the present invention will be more fully understood from the following detailed description of a preferred embodiment of the invention, especially when that detailed description is read in conjunction with the accompanying figures of the drawings.

BRIEF DESCRIPTION OF THE DRAWINGS

In the drawings, in which like reference characters designate like parts,

FIG. 2 shows a multiple effect evaporator system of the invention.

DETAILED DESCRIPTION OF PREFERRED EMBODIMENTS

Figure 1:
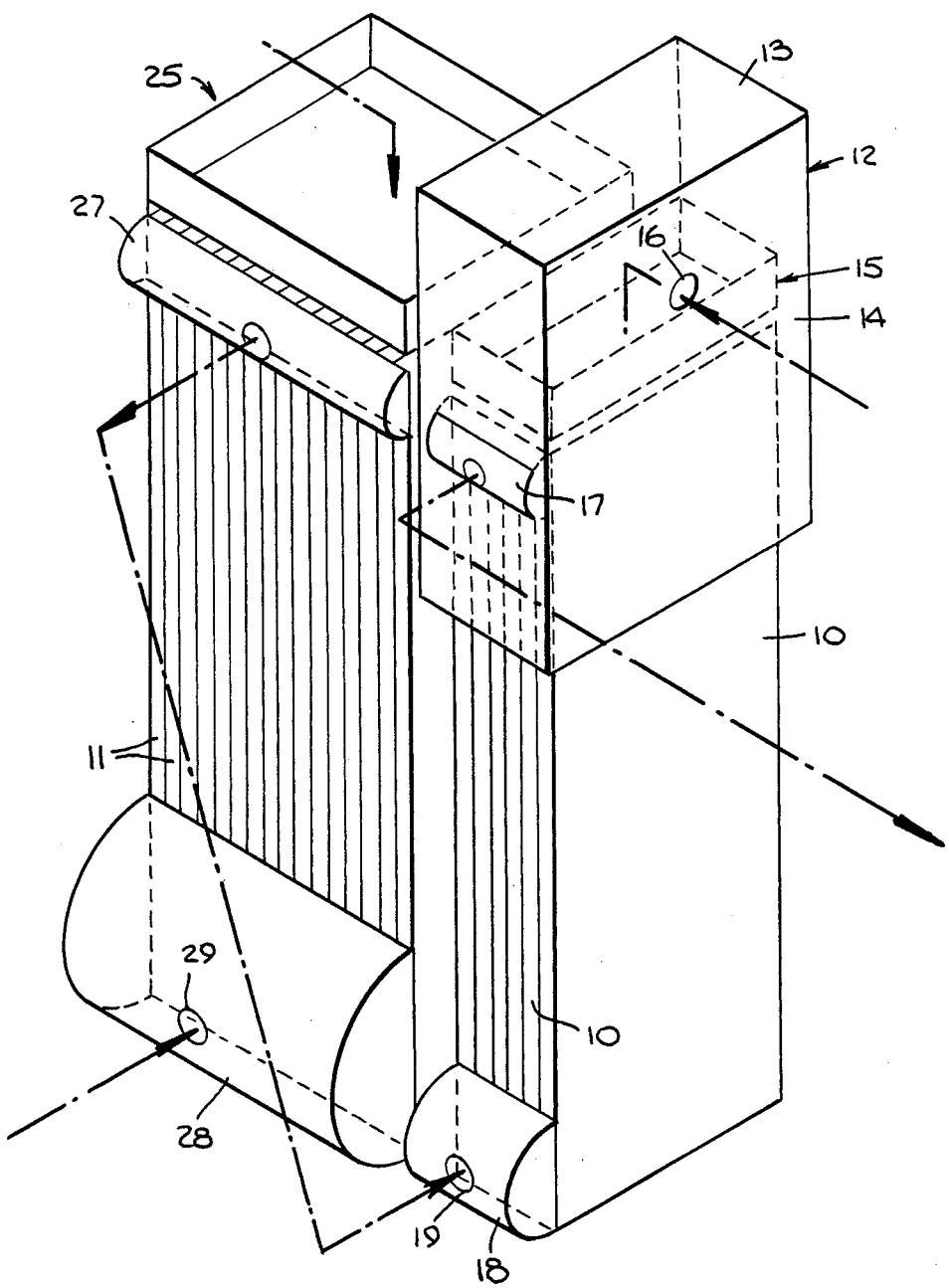
FIG. 1 is a simplified view, with piping and casing omitted, of an evaporator unit according to the invention.

Drawing FIG. 1 shows the internal parts of a falling film evaporator in accordance with the invention. In an evaporator the parts shown in FIG. 1 are enclosed within a housing or casing, as illustrated in FIG. 2 or as shown in the aforementioned U.S. patents.

Plate type heating elements 10 and 11 are seen to be arranged generally parallel to each other with opposed surfaces of adjacent elements defining vertical channels which allow for the flow of liquid coolant down the surfaces of the elements 10 and 11 as a falling film. The elements 10 comprise one group of elements which is beneath a hood, generally designated by reference numeral 12, which is in the form of a box having a top 13 and side walls 14. The upper ends of the plate elements 10 are surrounded by the side walls 14 of the hood 12, which has an open bottom, allowing free passage of vapor from within the hood 12 to the interior space of the evaporator housing (which has not been illustrated in FIG. 1 in order to show the other parts more clearly). The plate elements 11 form another group, which are not beneath a hood.

Positioned directly above the elements 10 within the hood 12 is a liquor distribution tray A 15 having a generally horizontal bottom and upstanding sides. The bottom of the tray A 15 has holes (not shown) which allow liquor to pass from the tray A 15 to the surfaces of the plate elements 10 beneath the tray A 15. The feed liquor is fed to the tray A 15 from outside the evaporator casing by means of a conduit (not shown in FIG. 1) which passes through a port 16 in a side wall of the hood 12 as shown by the arrow in FIG. 1.

The plate elements 10 of the pre-heating section of the evaporator, that is, the elements beneath the hood 12, are all in communication with an upper header 17, via which vent gases exit from the elements 10 as shown by an arrow in FIG. 1, through a conduit (not shown) which passes through a wall 14 of the hood 12 and through the evaporator's outer housing.

The elements 10 of the pre-heating section are also all in communication with a bottom header for the entry of heating vapor into the elements 10 by way of a vapor entry port 19.

The elements 11, which are not arranged beneath the hood 12, are interconnected by a top header 27 and a bottom header 28 and are provided with a flow of cooling liquor distributed via a liquor distribution tray B 25, which, like the tray A 15 has a perforated flat bottom and upstanding side walls.

Vapor enters the bottom header 28 through a port 29, as shown by an arrow, passes upward through the elements 11, and exits the upper header 27, whence it is passed, as shown in FIG. 1, to the lower header 19 of the elements 10 beneath the hood 12.

The liquor circulation through a multiple effect evaporator system is shown in FIG. 2, which shows how liquor can be supplied to the distribution tray B 25 by circulating a portion of the liquor collected at the bottom of the evaporator effect to the tray B 25 by means of a suitable conduit and pump. Four evaporator effects, A, B, C and D are shown. FIG. 2 shows the liquor fed into the top of the evaporator effect D at the far right and condensed product exiting from the bottom of the evaporator effect A on the far left of the drawing.

The heating vapor, usually steam, is circulated countercurrently to the liquor, passing from the upper zone of each effect to a vapor entry at the bottom of the next effect, in a manner similar to that shown for the internal vapor circulation from the top of elements 11 to the bottom of the elements 10 in FIG. 1. For simplicity, the steam circulation is not illustrated in FIG. 2, but each of the effects A-D can have steam circulating as shown in FIG. 1.

The use of multiple effect evaporators operating in countercurrent flow is well known in the art, so it is not necessary to describe the piping, pumps, etc. in detail. What is not previously known, is the use of the liquor preheating, vapor subcooling arrangement of this invention in a plate type evaporator or within evaporator stages of a multiple effect evaporator.

In the course of operation of the evaporator of FIG. 1, liquor to be evaporated is fed to the distribution tray A 15, at a temperature of, say 165° F. This liquor will boil through heat exchange with steam passing within the elements 10, and any liquor which has not evaporated will collect at the bottom of the evaporator.

The vapor generated by the boiling liquor, which will include both condensibles and noncondensibles, will rise within the evaporator casing, and the space within the hood 12 will collect noncondensibles, and will fill with the noncondensibles as the evaporator continues to run. These noncondensibles can only escape from the hood when they have completely filled the hood and can pass out under the lower edges of the hood walls 14. The result of this is that condensibles cannot enter the hood and directly contact the liquor above or near the tops of the elements 10. The noncondensibles gathered under the hood 12 cannot heat the liquor to any significant degree, so the liquor is heated indirectly by the heating medium inside the elements 10 and begins boiling before it escapes from the hooded zone. This results in an operating state in which the liquor is preheated within the hood 12, and the outgoing vapor which leaves the elements 10 via the header 17 is subcooled, to a temperature of, say 175° F. The liquor collected at the bottom of the evaporator will have a temperature of, say 185° F.

Consider that the evaporator just described is the evaporator effect D of the four effect evaporator of FIG. 2. Some of the liquor collected at the bottom of the evaporator is circulated to the distribution tray B 25 to fall down the elements 11, and some of the collected liquor goes on to the evaporator of effect C, which also has a hooded group of plate type elements. The liquor is hotter than the 165° F. temperature at which it was initially fed into effect D, and it is again preheated within the hood 12 of the evaporator of effect C by indirect heat exchange with the steam within the plate elements 10 of effect C.

The process is repeated in effects B and A until a condensed liquor product is removed from the bottom of effect A. Efficiency of operation is enhanced in each effect. Venting losses are reduced.

Those acquainted with the art will understand various applications of the arrangement and method of the present invention which have not been described in detail.

I claim:

1. A falling film evaporator comprising a plurality of heating elements, said heating elements are envelopes comprised of flat plates joined at their peripheries; means for circulating a heating medium through the elements, in which some elements have their upper portions enclosed within a downwardly open hood; means for distributing liquor to be evaporated to surfaces of the heating elements, said hood serving to prevent direct contact heat exchange between feed liquor to be evaporated and condensible vapor generated by the evaporation of the liquor a vent exhaust port disposed within the hood; and means for feeding heating medium exiting from heating elements which do not have their upper portions enclosed within said hood to said elements which have their upper portions enclosed within said hood.

2. The evaporator of claim 1 wherein the means for circulating the heating medium includes a lower header interconnecting the envelopes near their lower ends and an upper header interconnecting upper ends of the envelopes for venting the envelopes.

3. A falling film evaporator comprising a plurality of heating elements within a casing, said heating elements comprised of generally flat plates joined together at their peripheries and the heating elements are interconnected by upper and lower headers; means for venting the heating elements, wherein some of the heating elements have upper portions enclosed within a hood within the casing for collecting noncondensibles with the hood to prevent direct contact of liquor to be evaporated with condensible vapor within the hood; and means for feeding steam exiting from heating elements which do not have their upper portions surrounded by a hood to the heating elements which have upper portions surrounded by the hood.

4. The evaporator of claim 3 wherein a liquor distribution tray is located within the hood above the heating elements.

5. A falling film evaporator comprising a plurality of heating elements within a casing, said heating elements are envelopes comprised of flat plates joined at their peripheries; means for venting the heating elements, wherein some of the heating elements have upper portions enclosed within a hood within the casing for collecting noncondensibles with the hood to prevent direct contact of liquor to be evaporated with condensible vapor within the hood; and means for circulating liquor collected at the bottom of the casing to a liquor distribution means positioned outside the hood for distributing liquor to heating elements which do not have their upper portions within the hood.

* * * * *

UNITED STATES PATENT AND TRADEMARK OFFICE
CERTIFICATE OF CORRECTION

PATENT NO.  :  4,944,839
DATED       :  July 31, 1990
INVENTOR(S) :  Axel E. Rosenblad It is certified that error appears in the above-identified patent and that said Letters Patent is hereby corrected as shown below:

Column 4:

line 26, after "liquor" there should be a semicolon --;--.

line 41, after "headers;" the following has been omitted:

--means for introducing steam into the heating elements;

line 57, after "peripheries" the following has been omitted:

--means for introducing steam into the heating elements;

Signed and Sealed this

Tenth Day of December, 1991

Attest:

HARRY F. MANBECK, JR.

*Attesting Officer*  *Commissioner of Patents and Trademarks*